United States Patent Office

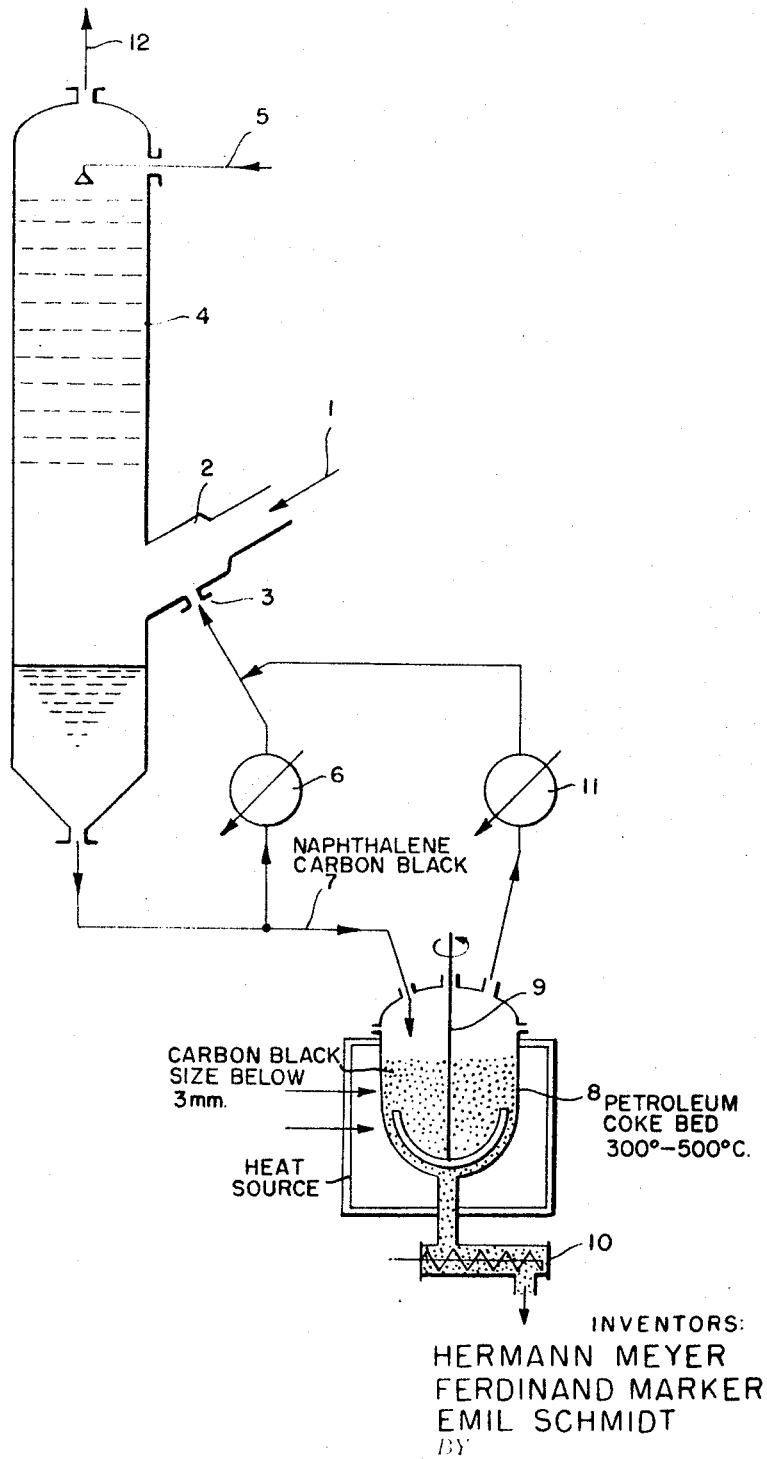

3,458,588
Patented July 29, 1969

3,458,588
REGENERATING NAPHTHALENE MIXTURES CONTAINING CARBON BLACK WITH SIMULTANEOUS RECOVERY OF GLOBULAR PETROLEUM COKE
Hermann Meyer, Ferdinand Markert, and Emil Schmidt, Ludwigshafen (Rhine), Germany, assignors to Badische Anilin- & Soda-Fabrik Aktiengesellschaft, Ludwigshafen (Rhine), Germany
Filed Dec. 14, 1964, Ser. No. 417,899
Claims priority, application Germany, Dec. 18, 1963, B 74,718
Int. Cl. C07c 15/24; C01b 31/00
U.S. Cl. 260—674   8 Claims

ABSTRACT OF THE DISCLOSURE

Regeneration of a liquid hydrocarbon mixture containing carbon black obtained by quenching cracked gases containing carbon black with naphthalene wherein the mixture is passed into an indirectly heated and mechanically agitated bed of petroleum coke with a particle size below 3 mm. Said bed is agitated with an internal stirrer operated at a speed to maintain said particle size of the petroleum coke. Said bed is maintained at a temperature of from 300 to 500° C., and carbon black is withdrawn from said bed in the form of dry globular petroleum coke.

---

This invention relates to a method of regenerating naphthalene mixtures containing carbon black which have been used for quenching hot gases obtained in the cracking of liquid hydrocarbons, especially in the production of acetylene.

It is known that the cracked gas obtained in the cracking of gaseous or liquid hydrocarbons for the production of gaseous olefins, acetylene or synthesis gas may be quenched and simultaneously washed with a high boiling oil, carbon black formed in the reaction being taken up by the oil. The oil thus heated up is usually recycled through a heat exchanger to produce steam and is used again for washing cracked gas. The carbon black absorbed from the cracked gas accumulates continually in the oil. At a certain level of carbon black, recognized by a viscous consistency of the oil at which the oil loses its pumpability, part of the oil containing carbon black must be replaced or diluted with an oil containing less carbon black or none at all. High boiling aromatic hydrocarbons having a boiling range of 150° to 350° C are usually used for quenching the hot reaction gas because these do not undergo any change in their chemical composition by contact with the hot reaction gases. Since these oils are more valuable than the usual fuel oils, it is important that they should be processed. The initial oils are too valuable for the oils containing carbon black to be used as fuel oils. Attempts have therefore been made to separate the carbon black and other carbon deposits from the washing oil by filtration or centrifuging. It has been found, however, that only the coarse-grained portion of the carbon deposits, the amount of which is relatively small, can be separated in this way and that a carbon black sludge containing oil remains which cannot be utilized.

Quenching and washing the hot cracked gas with water has the disadvantage that the heat contained in the cracked gas is lost and cannot be utilized for the production of steam. Other disadvantages reside in the hydrophobic properties of carbon black which is only incompletely wetted and taken up by water. After it has been quenched, the gas must be freed from residual carbon black by means of a soot filter. Moreover the carbon black is not obtained in dry form.

It has also already been proposed to regenerate hydrocarbon oils having a boiling range of 150° to 350° C. and containing carbon black with simultaneous recovery of petroleum coke by reacting the hydrocarbon oil containing carbon black in a fluidized bed of petroleum coke with oxygen or gases containing oxygen, if desired in the presence of steam.

We have now found that mixtures containing carbon black (such as are obtained by quenching cracked gases containing carbon block with naphthalene) can be regenerated in a simple manner with simultaneous recovery or valuable globular petroleum coke by passing the mixture containing carbon black into an indirectly heated and mechanically agitated bed of petroleum coke with a particle size below 3 mm., maintaining in this bed a temperature of from 300 to 500 C., and withdrawing the carbon black from the bed in the form of dry globular petroleum coke. By "mechanically agitated bed of petroleum coke" we understand a non-fluidized bed of petroleum coke which is agitated by means of stirrers or similar equipment.

Naphthalene or mixtures which contain naphthalene as an essential component (such as are used for quenching hot cracked gases in the cracking of gaseous or liquid hydrocarbons to form acetylene, olefins or sythesis gas) may be regenerated by the process according to this invention and in this way freed from the carbon black taken up from the cracked gases during quenching so that the naphthalene may be used again for quenching. The excess carbon black obtained in the form of dry globular petroleum coke granules may be put to other advantageous uses. The use of naphthalenes having a narrow, defined boiling point range has the advantage that separation of the carbon black is carried out in a narrow temperature range, whereas in the case of mixtures of hydrocarbons having widely different boiling points, the temperature of the fraction having the highest boiling point is decisive.

The level of carbon black in the naphthalene used for quenching is advantageously allowed to rise as high as possible. When the carbon black content is low, the expenditure for separating the carbon black is relatively great. Generally mixtures having a carbon black content of 15 to 35% by weight, preferably 20 to 25% by weight, are processed according to this invention.

In carrying out the process according to this invention it is possible to use for example agitated vessels in which the bed of petroleum coke is kept moving by a stirrer and which are heated indirectly from outside or by internal radiation pipes, or externally heated rotary kilns in which mixing is effected by the petroleum coke rolling down along the wall of the rotary kiln. Particularly uniform mixing and pelletization of the petroleum coke is achieved in an agitated vessel having a curved bottom, particularly a hemispherical bottom. The stirrer is advantageously designed so that as far as possible it sweeps the entire inner surface of the vessel. The shaft of the stirred may be provided with a screw which moves the petroleum coke upwardly in the bed and thus considerably promotes mixing. The amount of globular petroleum coke in the agitated layer is advantageously kept constant by continuous or intermittent withdrawal of the coke. The particle size of the globular petroleum coke may be regulated by the agitator speed or the speed at which the kiln is rotated. In general, the particle size will be the smaller the higher the agitator speed or the speed is at which the kiln is rotated. Good results are obtained by adjusting the agitator speed, measured at the point of maximum distance from the shaft, to, for example, 50 to 100 meters per minute, preferably 70 to 90 meters per minute. Generally the naphthalene containing carbon black is introduced direct into the hot bed of globular petroleum coke. It is however also possible to atomize the naphthalene containing carbon black above the bed.

In separating the carbon black, the naphthalene is vaporized and may be used again after it has been condensed. Heat liberated by condensation may be used in a simple way for the production of steam. Cyclone separators may be dispensed with because the vapor of the napthalene is free from carbon black and there is no risk of deposition of the same in the exchange apparatus. When carrying out the process it is advantageous to withdraw a branch stream from the recycled quenching liquid and by regulation thereof to keep the carbon black content of the quenching liquid constant or to alter it in a desired manner. A temperature of 300 to 500° C., preferably 350 to 450° C., it maintained in the bed of the agitated vessel or rotary kiln serving for the regeneration. When the quenching liquid comes into contact with the hot globular petroleum coke, the napthalene evaporates rapidly and the carbon black forms fresh globular particles of petroleum coke owing to the stirring or rotary movement. The initial petroleum coke used has a particle size below 3 mm. in diameter, preferably of from 0.1 to 1.5 mm.

The size of the particles of petroluem coke may be influenced and varied in the desired manner, for example, by changing the speed of stirring or rotation, by the way in which the quenching liquid is introduced into the agitated coke bed, for example through a tube dipping into the same of which the depth of immersion may be varied, or by a suitable method of atomization.

The naphthalene used is recovered in the process according to this invention without loss and chemically unchanged. Petroleum coke prepared according to this invention is obtained in the form of dry globular particles having a compact nature and a smooth surface which may be easily handled without development of dust. The petroleum coke obtained is free from tarry or asphaltic constituents and from volatile constituents from the quenching liquid.

A scheme for a plant for carrying out the process according to this invention is shown diagrammatically by way of example in the accompanying drawing.

Gaseous or liquid hydrocarbons are cracked to acetylene, olefins or synthesis gas in the reactor 2 of a cracking apparatus with oxygen which enters through line 1.

Hot cracked gas containing carbon black is quenched to 200° C. with naphthalene from a supply 3, the carbon black being taken up by the naphthalene. The mixture of cracked gas, vapor and naphthalene containing carbon black is passed into a column 4 in which the cracked gas is separated. The unvaporized naphthalene containing carbon black collects at the base of the column 4. Vapor entrained with the cracked gases is precipitated by a light oil fraction which is added to the top of the column through line 5. The condensate also collects in the base of the column 4. The naphthalene containing carbon black is passed from the base of the column 4 through a waste heat boiler 6 and may then be used again for quenching. Since carbon black would accumulate in the recycled quenching liquid in the course of time, a branch stream 7 of the quenching liquid containing carbon black is branched off and regenerated. For this purpose the naphthalene containing carbon black is passed according to this invention into an externally heated container 8 in which it is brought into contact with a bed of hot globular petroleum coke particles which are kept in motion by an agitator 9. Naphthalene and carbon black are thus separated from each other by the action of heat. Carbon black separates in the form of small coke globules the excess of which is continuously withdrawn through a screw 10, while the vaporous naphthalene is condensed in a heat exchanger 11 and used again for the quenching of cracked gas. The carbon black content of the recycled quenching liquid may be regulated by the branch stream 7. Cracked gas free from carbon black is withdrawn from the top of the column through line 12 for further processing.

The invention is further illustrated by the following examples, using the apparatus illustrated in the drawings.

Example 1

800 cubic meters (S.T.P.) per hour of a gas containing acetylene and also containing 16 kg. of carbon black is produced in a burner 2. Naphthalene introduced through line 3 separates the carbon black from the hot cracked gas and thereby becomes heated up to 180° C. The mixture collects in the base of the column 4 and is recycled to the line 3. 80 kg. per hour of the mixture is withdrawn from the cycle and passed into a bed of globular petroleum coke particles which is at a temperature of 420° C. and which is gently moved by a stirrer. 16 kg. per hour of carbon black is separated from the naphthalene in this bed in the form of completely dry, small globules of petroleum coke having an average radius of 2 mm., while 64 kg. per hour of naphthalene is evaporated and serves for the production of 20 kg. per hour of steam at 200° C. in a heat exchanger 11. The naphthalene is thus condensed and may be returned to the naphthalene cycle. The cracked gas containing acetylene, which is free from carbon black, is withdrawn at the top of the column 4 and supplied to further processing.

Example 2

Synthesis gas containing mainly carbon monoxide and hydrogen and entraining 11 kg. per hour of carbon black is prepared at the rate of 800 cubic meters (S.T.P.) per hour in a burner in the apparatus described in Example 1. The carbon black is taken up by naphthalene used for quenching the cracked gas, the naphthalene thus being heated up to 180° C. The mixture of naphthalene and carbon black is recycled to the quenching zone. 40 kg. per hour of a mixture of naphthalene and carbon black is withdrawn from the cycle and passed into a bed of small petroleum coke globules heated to 420° C. which is being moved by a stirrer. 11 kg. per hour of carbon black thus separates from the naphthalene in a completely dry form as small petroleum coke globules having an average radius of 2 mm., while 29 kg. per hour of naphthalene vaporizes and is condensed in a heat exchanger (in which 8 kg. per hour of steam is produced at 200° C.) and returned to the naphthalene cycle. The synthesis gas free from carbon black is withdrawn at the top of the column and supplied to further processing.

We claim:

1. In a method of regenerating naphthalene contaminated with carbon black as a mixture obtained by quenching a hot cracked gas containing carbon black with naphthalene during the cracking of a hydrocarbon for the production of acetylene, olefins or synthesis gas, the improvement which comprises:

withdrawing the naphthalene containing carbon black mixture from the quenching area and recycling a first portion of said mixture through a waste heat boiler as quenching liquid;

introducing a second remaining portion of said mixture into an indirectly heated and mechanically agitated bed of petroleum coke with a particle size below 3 mm., said bed being agitated with an internal stirrer operated at a speed to maintain said particle size;

maintaining in said bed a temperature of from 300° C. to 500° C. which is sufficient to vaporize without decomposing said naphthalene;

withdrawing and recovering said vaporized naphthalene from said bed substantially free of carbon black;

condensing said vaporized naphthalene and combining the condensed naphthalene with the recycled first portion as recycled quench liquid; and withdrawing said carbon black from said bed in the form of a dry globular petroleum coke.

2. A method as claimed in claim 1 wherein the amount of globular petroleum coke in said bed is maintained constant by withdrawing the coke newly formed.

3. A method as claimed in claim 1 wherein said bed of petroleum coke is internally heated by indirect heat exchange and is mechanically agitated by a rotating stirrer.

4. A method as claimed in claim 1 wherein said bed of petroleum coke is mechanically agitated in an externally heated rotary kiln wherein the coke is mixed and kept in motion by rolling down along the walls of the rotating kiln.

5. A method as claimed in claim 3 wherein the speed of the rotating stirrer, measured at the point of maximum distance from its shaft, is maintained at a rate of 50 to 100 meters per minute, thereby regulating the granular size of the globular petroleum coke.

6. A method as claimed in claim 4 wherein the speed of the rotary kiln, measured around its inner diameter, is maintained at a rate of 50 to 100 meters per minute, thereby regulating the granular size of the globular petroleum coke.

7. A method as claimed in claim 1 wherein the content of carbon black in the mixture being introduced into the petroleum coke bed is about 15 to 35% by weight.

8. A method as claimed in claim 1 wherein the content of carbon black in the mixture being introduced into the petroleum coke bed is about 20 to 25% by weight.

References Cited

UNITED STATES PATENTS

| 1,974,295 | 9/1934 | Alther | 208—50 |
| 2,039,981 | 5/1936 | Rembert | 196—128 |
| 3,133,014 | 5/1964 | Cross | 196—128 |

WILBUR L. BASCOMB, JR, Primary Examiner

DAVID EDWARDS, Assistant Examiner

U.S. Cl. X.R.

23—209.1; 201—22, 23, 29, 33; 208—179